(No Model.)

L. GATHMANN.
GRINDING MILL.

No. 254,813. Patented Mar. 14, 1882.

WITNESSES
F. U. Adams
W. C. Adams

INVENTOR
Louis Gathmann
per M. E. Dayton
Attorney

UNITED STATES PATENT OFFICE.

LOUIS GATHMANN, OF CHICAGO, ILLINOIS.

GRINDING-MILL.

SPECIFICATION forming part of Letters Patent No. 254,813, dated March 14, 1882.

Application filed June 27, 1881. (No model.)

*To all whom it may concern:*

Be it known that I, LOUIS GATHMANN, of Chicago, in the county of Cook and State of Illinois, have invented certain new and useful Improvements in Grinding-Mills; and I do hereby declare that the following is a full, clear, and exact description thereof, reference being had to the accompanying drawings, and to the letters of reference marked thereon, which form a part of this specification.

This invention relates to a disk grinding-mill having one of its disks of a certain specified form, described in another patent of even date herewith; and it consists in the combination, with such special disk, of an opposing disk having its working-face of sharply rough or granular structure, like or similar to the ground or broken surface of porcelain.

It also consists in certain features of improvement in the aforesaid special form of disk, as will be hereinafter fully set forth and claimed.

Figure 1:
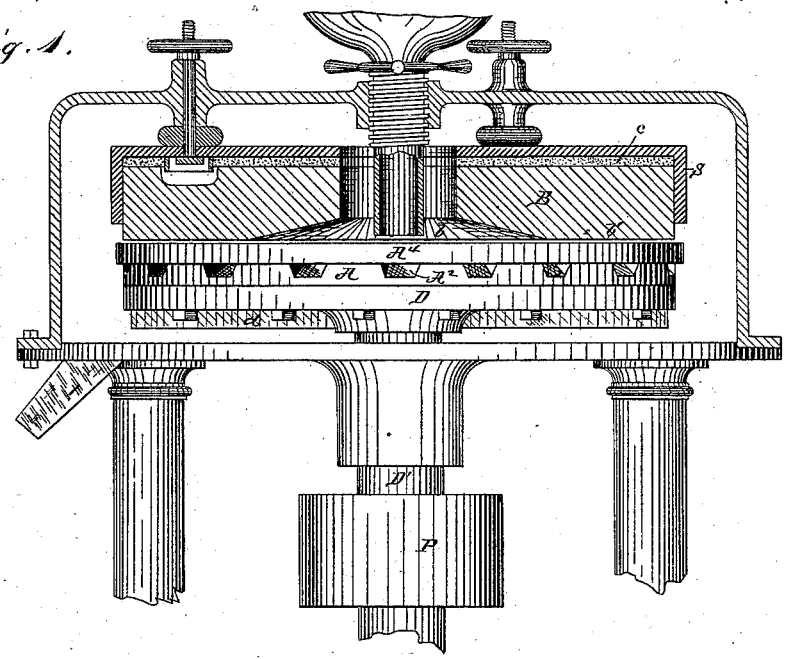
Figure 2:
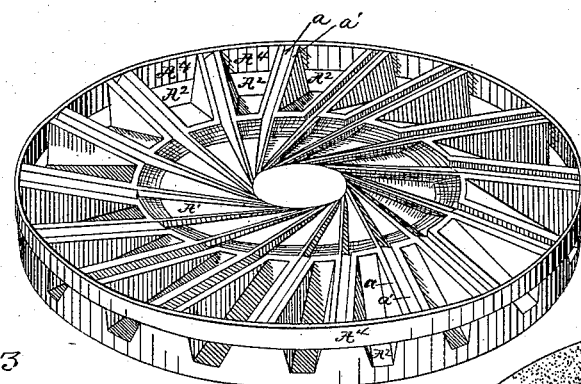
Figure 3:
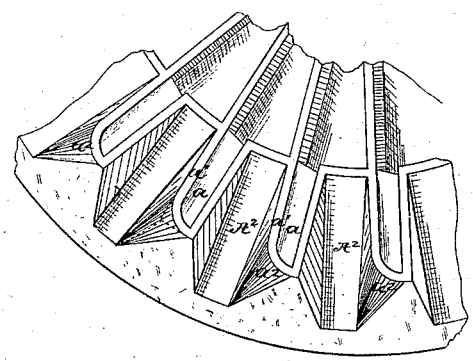
Figure 4:
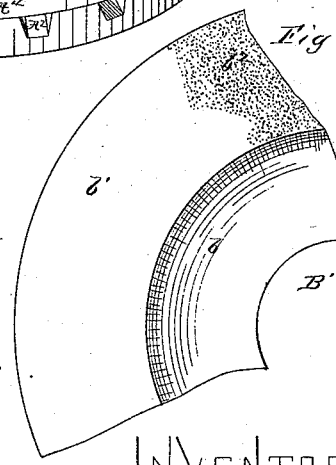

In the accompanying drawings, Figure 1 is a vertical section of the curb and upper or stationary disk of a vertical-axised mill containing my present improvements, the lower and (in this case) runner disk and bed-plate of the curb being shown in side elevation. Fig. 2 is a perspective of the special form of disk employed in this invention, showing one form of my improvement therein. Fig. 3 is a fragmentary view of the same special disk, showing another form of improvement therein, as will be explained. Fig. 4 is a fragmentary face view of the opposing disk, having a minutely-rough working-face.

As here shown, A is the runner-disk, being of a special form, the distinctive features of which, as set forth in the patent therefor, are as follows: A central depressed bosom, $A'$, communicates with the feather-edged or inclined-bottomed furrows $a$, which terminate inside the margin of the disk, so that grain admitted thereto finds escape from said furrows only over the adjacent lands $a'$. Between each two adjacent furrows of the disk is a deep recess, $A^2$, terminating at its inner end outside the boundary of the bosom $A'$, so that no grain can enter said recess except as it first passes into the furrow $a$ and over the land $a'$. The outer ends of the recesses $A^2$ are open broadly at the margin of the disk, and their rearward walls (having reference to the direction of motion) are abrupt, so that material received therein does not rise again to the working-face of the disk, but is at once discharged at the open end of the recesses. The object of this construction is obviously to secure in a furrowed disk a definite and uniform degree of reducing action upon all parts of the material operated upon. To this end, of course, the lands $a'$ are of substantially equal width upon their faces throughout the length of each and as compared each with another. In relation to the feature of uniformity in width of land-faces throughout their length, I here present an improvement which has reference to exactness and economy in the construction of the said disk A when the faces of the furrows $a$ are required to be smooth. Said disk will usually be made of steel or chilled iron, and the furrows will be dressed or smoothed out with an emery-wheel. Owing to the form of this means of dressing the furrows, and to avoid unnecessary grinding, the outer end of the furrows will be cast to have the curved outline along its feather-edge shown in Fig. 3.

If, as indicated in the before-mentioned patent and also by the dotted lines, Fig. 3, the land-wall of the recess $A^2$ is run straight to the margin of the disk, the working-land $a'$ will be broader at its outer end than elsewhere. While this will usually be of little practical moment, I prefer to make said land more accurately uniform in width throughout its length, and for this purpose the recess $A^2$ is flared at its outer end, as shown at $a^2$, so as to cut the working-face in a curved line parallel with that of the feather-edge of the furrow $a$, to be finished out with a wheel, as described. In this manner the cast disk may be made perfect in respect to the uniform width of the land, and a wholly uniform action may be thereby produced upon the material passed over the same.

In Fig. 2 another means for securing uniform width of the land is shown—namely, by casting the disk with all its furrow and recess lines straight, and running the furrows $a$ clear through to the margin of the disk. Then, after dressing out said furrows, a steel hoop, $A^4$, is shrunk about the disk to close the outer ends of the furrows $a$, said hoop being of such narrow width as to allow the recesses $A^2$ to discharge beneath it; or said hoop may be of the full width of the disk-margin and the disk-recesses discharge at the bottom.

In the machine here described the working-face of the disk A, including especially the lands $a'$, is finished smooth and true.

B is the stationary disk, having the central feed-aperture, B', a surrounding depressed surface, $b$, and the marginal skirt $b'$, of equal width and parallel with the furrowed and recessed face of the disk A. Said stationary disk is mounted in any approved manner, but is preferably rigidly fixed in the cast-iron shell S by cement $c$, which shell is made a medium for the support and adjustment of such disk in the familiar manner indicated in Fig. 1. The marginal skirt $b'$ of the disk B is without furrows of any kind, but has a rough surface, (indicated at $b^2$, Fig. 4.) For the more especial purpose of this machine—namely, the reduction of middlings to flour—I propose to make the disk B of porcelain, having its skirt-face ground true or turned off with a diamond, but unpolished. The natural grit of such porcelain disk, when opposed to the smooth lands $a'$ of the disk A, is found to be well adapted to the purpose mentioned, and the character of the porcelain surface is not modified by its wear in this situation and use.

The disks may, if preferred, be mounted on a horizontal axis, and either disk may be the runner. I, however, prefer the arrangement shown.

I claim as my invention—

1. In combination with the disk A, having the alternating closed furrows $a$, lands $a'$, and open recesses $A^2$, and also having the land-faces smooth, the opposing disk B, having its working-face $b$ continuous and of a sharply rough or granular structure, substantially as described.

2. In combination with the disk A, having the alternating closed furrows $a$, lands $a'$, and open recesses $A^2$, and also having its land-faces smooth, the opposing disk B, of porcelain, the working-face $b'$ thereof presenting the natural granular structure of the porcelain in opposition to the smooth faces $a'$ of the disk A, substantially as described, and for the purposes stated.

3. In the disk A, having the alternating closed furrows $a$, lands $a'$, and outwardly-open recesses $A^2$, the said recesses cast in form to cut the working-face of the disk in a curve parallel with the curved feather-edge of the furrows $a$, substantially as described, and for the purposes stated.

In testimony that I claim the foregoing as my invention I affix my signature in presence of two witnesses.

LOUIS GATHMANN.

Witnesses:
M. E. DAYTON,
JESSE COX, Jr.